June 1, 1937. C. O. G. WITTIG 2,082,090
SUSPENDED TYPE FIRE EXTINGUISHER
Original Filed Dec. 15, 1933
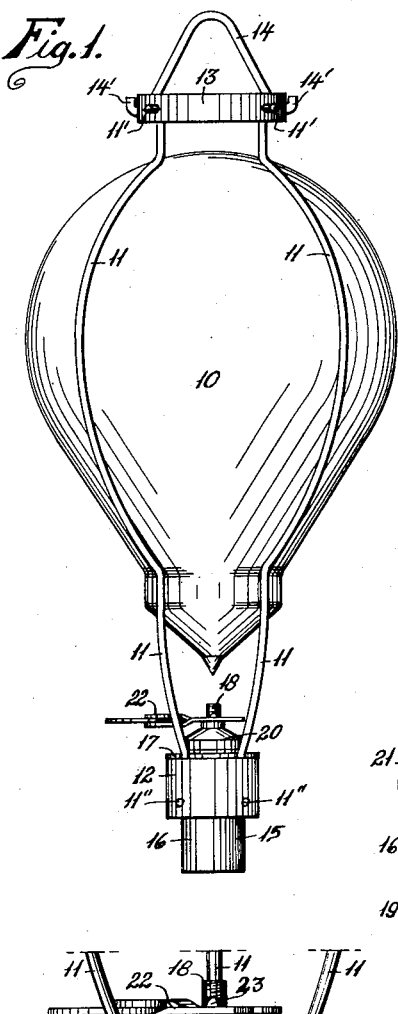
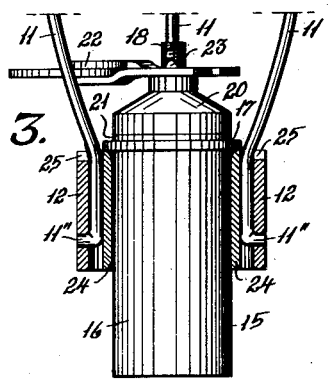
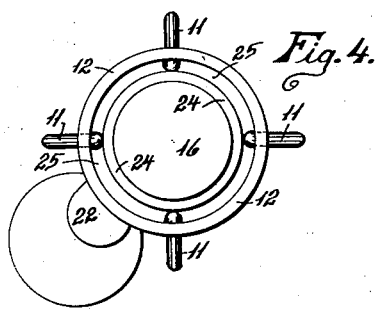
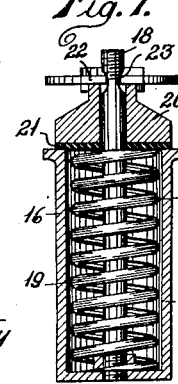
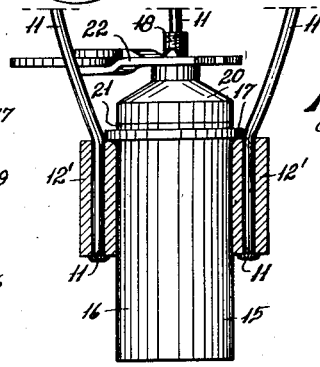
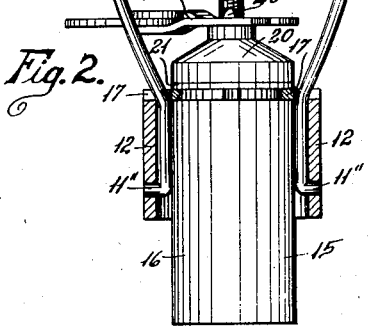
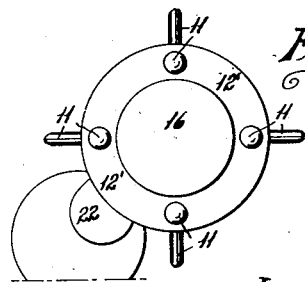
Inventor:
Carl O. G. Wittig.
By Homer L. Luret.
Attorney.

Patented June 1, 1937

2,082,090

UNITED STATES PATENT OFFICE 2,082,090

SUSPENDED TYPE FIRE EXTINGUISHER

Carl O. G. Wittig, Golden, Colo.

Application December 15, 1933, Serial No. 702,614
Renewed October 10, 1936

7 Claims. (Cl. 169—26)

An object of this invention is to provide an improved fire extinguisher.

A further object of the invention is to provide an improved automatically heat-operable fire extinguisher.

A further object of the invention is to provide improved supporting means for an automatic, heat-operable fire extinguisher.

A further object of the invention is to provide an improved combination of automatically heat-operable releasing means with fire extinguisher supporting means.

A further object of the invention is to provide improved means for supporting a spring-actuated projectile in operative relation with a frangible container.

A further object of the invention is to provide an improved combination of solution-charged, frangible container with automatically heat-operable means adapted to fracture said container and release the solution therefrom.

A further object of the invention is to provide an improved arrangement of supporting means adapted to position a frangible, solution-charged container and a unitary, removable and replaceable, heat-operable, container-fracturing assembly in operative interrelation.

A further object of the invention is to provide an improved complete automatic fire extinguisher unit which is simple and inexpensive of manufacture and installation, positive and efficient in action, susceptible of ready rehabilitation after use, and which requires no maintenance.

My invention consists in the construction, arrangement and combination of elements hereinafter set forth, pointed out in my claims and illustrated by the accompanying drawing, in which—

Figure 1 is an elevation of my improved extinguisher unit assembled and ready for practical use. Figure 2 is a detail, fragmentary section, on an enlarged scale, vertically through the actuating assembly supporting means shown in Figure 1. Figure 3 is a sectional view similar to Figure 2 illustrating a modified construction. Figure 4 is a bottom plan view of the showing of Figure 3. Figure 5 is a sectional view similar to Figure 2 illustrating a still further modified construction. Figure 6 is a bottom plan view of Figure 5. Figure 7 is a detail section axially of the removable and replaceable actuating assembly employed in the improved extinguisher.

In the construction of the improved extinguisher as shown, the numeral 10 designates a frangible container formed of any suitable, easily-fracturable material, such as glass, in any desired size and shape, the pear-shaped form of container illustrated being convenient and well-adapted to use with the other elements of the invention, though it will be obvious that the specific form of said container is in no sense fundamental to the invention. The container 10 is substantially filled with a suitable fire-extinguishing solution and subsequently sealed from the atmosphere, as is common and well-known practice, to produce a bomb-like unit of established commercial type, which in itself forms no part of the instant invention.

To support the container 10 and permit mounting thereof by suspension at strategic points within and about buildings and structures to be protected against fire, a cage or basket is formed of a plurality of wires 11, in this instance four in number, suitably bent to receive and support the said container and uniformly spaced one from the other with their lower ends secured within a cylindrical sleeve 12, as will be hereinafter more fully described, and their upper ends, each formed with a hooked terminal 11', extending within an annulus 13 which is provided with uniformly spaced holes adapted to loosely receive the terminals 11', the pressure of the container 10 against the bent portions of the wires 11 serving to retain the terminals 11' in outwardly projecting relation in and through the holes in the annulus 13, from which relation said terminals may be sprung inwardly and out of engagement with the said annulus to permit removal of the latter and spreading of the then free ends of the wires 11 for removal or replacement of the container 10 relative to its supporting cage or basket. A bail is formed of a suitably bent length of wire 14 having hooked ends 14' engaging through diametrically opposite holes in the annulus 13, whereby the basket or cage supporting the container 10 may be suitably hung from hooks, brackets, and the like, positioned on walls, ceilings and structural elements of buildings and structures.

The construction and assembly thus far described presents a complete fire extinguisher for manual operation, since the container in its supporting basket may be readily grasped by an operator, instantly detached from its supporting element and hurled as a bomb in the direction of a fire, said container breaking on impact to release its solution for suppression of said fire. However, to enhance the efficiency of the device and render it strictly automatic in operation, means are provided for the release of the solution from the container when the temperature about the device reaches a predetermined point.

To provide automatic, heat-operable means for releasing the solution from the container 10 in the event of fire, a unitary, removable and replaceable assembly, indicated generally by the numeral 15, is provided, which assembly is adapted to seat in and extend through the sleeve 12, as hereinafter more fully explained, in axial alignment with and beneath the container 10. The assembly 15 comprises a tubular housing 16, of suitable length, closed at one end and formed with an annular flange 17 surrounding its open end. A stem 18 has one end fixed centrally of the closed end of the housing 16 and extends axially through said housing to project at its other end some distance beyond the flange 17, and an expansive coil spring 19, having an uncompressed length considerably in excess of the housing length, is received loosely in the housing 16 about the stem 18. A projectile element 20, preferably tapered in elevation, is formed with an axial bore of a size to slide freely on the stem 18 and a base sufficiently large to overlap on and close the open end of the housing 16, and said element 20 is mounted on said stem 18 against the pressure of the spring 19 in closing relation with the housing 16, a gasket element 21 of suitable yielding material being interposed between the base of the element 20 and the flange 17 to seal the joint therebetween and prevent the entry of corrosive moisture, vapors or gases into the interior of the housing 16. The element 20 is normally held in closing relation with the housing 16 against the pressure of the spring 19 by the spaced fingers of a fusible clip 22 engaging in arcuate notches 23 formed in opposite sides of the stem 18 adjacent the position defined by the striking surface of said element when the latter is in its closing relation with the housing 16, said element bearing against and being restrained by the fingers of said clip and thus holding the latter in its engaging relation with the stem 18. The clip 22 preferably comprises similar fingers formed with enlarged end portions overlapped on and connected by solder fusible at a predetermined temperature to a disc of material having high heat conductivity, the finger portions of said clip being arranged in parallel relation and spaced apart a distance equal to the thickness of the stem 18 between the arcuate notches 23, it being, however, obvious that any suitable, heat-releasable retainer may be employed to hold the element 20 against the pressure of the spring 19. The free end of the stem 18 above the element 20 is preferably threaded and thereby adapted to receive a nut which may be employed to lock the elements of the assembly 15 securely together and guard against accidental release of the element 20 during handling, transportation or storage of such assembly.

The wires 11 supporting the container 10 extend a distance below said container and terminate in outwardly-directed, short hooks 11'', the lower ends of said wires being received within the sleeve 12 with the hooks 11'' seated in holes formed for that purpose in said sleeve so that said wires lie closely along the inner surface of said sleeve. The inner diameter of the sleeve 12 is such as to provide a spacing between opposite terminals of the wires 11 substantially equal to the external diameter of the housing 16, thus permitting insertion of the assembly 15 between said wires axially of the sleeve 12, in which position said assembly serves to clamp the hooks 11'' in their engaging relation with said sleeve, the flange 17 of said assembly being notched to accommodate the upwardly-extending portions of the wires 11 and resting on the upper margin of the sleeve 12 to positively position said assembly within and relative to said sleeve.

In the modification according to Figures 3 and 4, the sleeve 12 and hooks 11'' are the same as above described save that said sleeve has a somewhat greater diameter, and a clamping sleeve 24 having an inner diameter approximating the external diameter of the housing 16 and formed with an annular flange 25 on one end is provided and arranged to telescope within the sleeve 12 and clamp the hooks 11'' in their engaging relation with said sleeve, the flange 25 resting against the upper margin of the sleeve 12 to determine the longitudinal interrelation of said sleeves and being notched to accommodate the wires 11. With this arrangement, the assembly 15 is seated in the bore of the sleeve 24 with the flange 17 engaging against the flanged end of said sleeve 24, said flange 17 being relatively narrow to clear inner margins of the wires 11.

In the modifications according to Figures 5 and 6, the sleeve 12 is replaced by a thick-walled sleeve 12' having a central bore of a diameter approximating the external diameter of the housing 16 in which the assembly 15 is adapted to seat directly and be positioned by engagement of the flange 17 against the upper margin of said sleeve, uniformly-spaced bores being formed in axially-parallel relation through the wall of said sleeve 12' to receive the straight, lower ends of the wires 11, which latter may be riveted or otherwise permanently secured within their respective bores.

In the modification according to Figures 5 and above described, the elements being assembled and arranged as illustrated, excessive heat in the vicinity of the clip 22 will act to soften the fusible solder connecting the members thereof and permit the clip fingers to spread apart under the pressure of the spring 19 acting to urge the element 20 upward along the stem 18, thereby releasing the element 20 and permitting the latter to be driven by the said spring into fracturing contact with the container 10, whereby the contents of said container may be released to suppress the fire producing the excessive heat. Rehabilitation of the operated unit may be simply and rapidly effected by substitution of a new charged container 10 and assembly 15 for the previous corresponding units.

It is obvious that as many units of the improved device as may be necessary may be employed to protect a given structure against fire and that they may be mounted as may be desired relative to said structure. Further, the weight of projectile, length of its travel and pressure of the spring may be altered and adjusted in manufacture to deliver a blow of the intensity required to positively fracture the container, irrespective of its form or contour.

Since many changes and modifications in the specific form, construction and arrangement of the elements of my improvement may be had without departing from the spirit of the invention, I wish to be understood as being limited solely by the scope of the appended claims rather than by any details of the illustrative showing and foregoing description.

I claim as my invention—

1. A fire extinguisher comprising a frangible, solution-charged container, a plurality of wires, spaced annuli removably interconnected with said wires and forming therewith a wire cage supporting means embracing said container and a heat-releasable, projectile-type unit assembly removably and replaceably carried by one annulus of said supporting means in potential fracturing relation with said container.

2. A fire extinguisher comprising the combination with a frangible, solution-charged container of wire cage supporting means embracing said container and arranged for suspension from a fixed support, an annular seat formed as an element of said supporting means, and a unitary heat-releasable, spring-pressed projectile assembly slidingly carried by said seat for removal and replacement relative to said cage in potential fracturing relation with said container.

3. In a fire extinguisher having a frangible, solution-charged container, a plurality of wires embracing said container and removably interconnecting annuli spaced on opposite sides of said container, means for suspending the upper of said annuli from a fixed support and a unitary heat-releasable, projectile assembly slidingly seated in and for removal and replacement relative to the lower of said annuli in potential fracturing relation with said container.

4. In a fire extinguisher having a frangible, solution-charged container, a plurality of wires embracing said container and removably interconnecting annuli spaced on opposite sides of said container, means for suspending the upper of said annuli from a fixed support and a heat-releasable, projectile-type unit slidingly seated in and for removal and replacement relative to the lower of said annuli in potential fracturing relation with said container.

5. In a fire extinguisher having a solution-charged, frangible container and supporting means therefor, a heat-releasable, projectile-type unit removably and replaceably carried by said supporting means in potential fracturing relation with said container, said unit comprising a base element adapted to seat in and be positioned by said supporting means, a guide element in fixed relation with said base element, a projectile slidable along said guide element, expansive spring means acting between said base element and projectile and a heat-separable clip engaging said guide element to normally hold said projectile against the pressure of said spring means.

6. A fire extinguisher comprising a frangible, solution-charged container, wire cage supporting means including removably interconnected, spaced annuli embracing said container, an annular seat formed in one of said annuli, and a unitary, heat-releasable, spring-pressed projectile assembly slidingly carried in said seat for removal and replacement relative to said supporting means in potential fracturing relation with said container.

7. A fire extinguisher comprising a frangible, solution-charged container, wire cage supporting means including removably interconnected, spaced annuli embracing said container, an annular seat formed in one of said annuli, a spring-pressed projectile unit assembly slidingly carried in said seat for removal and replacement relative to said supporting means in position to impinge on and fracture said container, and means including a heat-separable clip element for normally retaining said projectile against the pressure of its spring and in potential fracturing relation with said container.

CARL O. G. WITTIG.